US010652608B2

(12) United States Patent
Ishigaya et al.

(10) Patent No.: US 10,652,608 B2
(45) Date of Patent: May 12, 2020

(54) RECEIVING APPARATUS AND METHOD, AND TRANSMITTING APPARATUS AND METHOD

(71) Applicant: Sony Corporation, Tokyo (JP)

(72) Inventors: Kazuhiro Ishigaya, Kanagawa (JP); Shinji Negishi, Kanagawa (JP); Noriaki Ooishi, Kanagawa (JP)

(73) Assignee: Sony Corporation, Tokyo (JP)

( * ) Notice: Subject to any disclaimer, the term of this patent is extended or adjusted under 35 U.S.C. 154(b) by 11 days.

(21) Appl. No.: 15/749,628

(22) PCT Filed: Sep. 2, 2016

(86) PCT No.: PCT/JP2016/075750
§ 371 (c)(1),
(2) Date: Feb. 1, 2018

(87) PCT Pub. No.: WO2017/047399
PCT Pub. Date: Mar. 23, 2017

(65) Prior Publication Data
US 2018/0227622 A1 Aug. 9, 2018

(30) Foreign Application Priority Data
Sep. 15, 2015 (JP) .................................. 2015-181821

(51) Int. Cl.
H04N 21/434 (2011.01)
H04N 21/43 (2011.01)
(Continued)

(52) U.S. Cl.
CPC ......... H04N 21/434 (2013.01); H04L 65/607 (2013.01); H04N 21/236 (2013.01); H04N 21/242 (2013.01); H04N 21/4305 (2013.01)

(58) Field of Classification Search
CPC ........................... H04N 21/236; H04N 21/434
See application file for complete search history.

(56) References Cited

U.S. PATENT DOCUMENTS 7,697,575 B2 *  4/2010  Kato ...................... H04H 60/73
                                                          370/505
7,864,812 B2 *  1/2011  Ishida ................. H04L 27/2647
                                                          370/252

(Continued)

FOREIGN PATENT DOCUMENTS

JP        2014-200054 A      10/2014
JP        2015-027091 A       2/2015

Primary Examiner — John R Schnurr
Assistant Examiner — Frank Johnson
(74) Attorney, Agent, or Firm — Michael Best & Friedrich LLP

(57) ABSTRACT

A receiving apparatus and method, and a transmitting apparatus, and method capable of improving a reproduction quality in a state where a packet loss occurs. The transmitting apparatus including a memory and an electronic processor communicatively connected to the memory. The electronic processor is configured to encode a data unit, generate a data packet by packetizing the data unit that is encoded, generate a time information packet by packetizing information indicating a decode and a display time relative to the data unit, and generate a stream by multiplexing the data packet, the time information packet, and identification information to identify the data unit.

20 Claims, 16 Drawing Sheets

(51) Int. Cl.
*H04N 21/236* (2011.01)
*H04L 29/06* (2006.01)
*H04N 21/242* (2011.01)

(56) References Cited

U.S. PATENT DOCUMENTS

| | | | | |
|---|---|---|---|---|
| 8,050,252 | B2* | 11/2011 | Compton | H04L 29/06027 370/352 |
| 2005/0013377 | A1* | 1/2005 | Kirihara | H04N 21/2365 375/240.26 |
| 2005/0105886 | A1* | 5/2005 | Abelard | G11B 20/00086 386/258 |
| 2014/0201798 | A1* | 7/2014 | Kazui | H04N 21/23614 725/116 |
| 2014/0317664 | A1* | 10/2014 | Park | H04N 21/23614 725/109 |

* cited by examiner

FIG. 9

| 0 | DATA STRUCTURE | BIT LENGTH | DATA NOTATION |
|---|---|---|---|
| 1 | MMTP_packet() { | | |
| 2 |   version | 2 | uimsbf |
| 3 |   packet_counter_flag | 1 | bslbf |
| 4 |   FEC_type | 2 | uimsbf |
| 5 |   reserved | 1 | bslbf |
| 6 |   extension_flag | 1 | bslbf |
| 7 |   RAP_flag | 1 | bslbf |
| 8 |   reserved | 2 | bslbf |
| 9 |   payload_type | 6 | uimsbf |
| 10 |   packet_id | 16 | uimsbf |
| 11 |   timestamp | 32 | uimsbf |
| 12 |   packet_sequence_number | 32 | uimsbf |
| 13 |   if(packet_scounter_flag==1) { | | |
| 14 |     packet_counter | 32 | uimsbf |
| 15 |   } | | |
| 16 |   if(extension_flag==1) { | | |
| 17 |     extension_type | 16 | uimsbf |
| 18 |     extension_length | 16 | uimsbf |
| 19 |     for(i=0;i<N;i++) { | | |
| 20 |       header_extension_byte | 8 | bslbf |
| 21 |     } | | |
| 22 |   } | | |
| 23 |   MMTP_pay_load | | |
| 24 | } | | |

FIG. 10

```
<Semantics>
extension_type
  0x0000: MULTI-TYPE HEADER EXTENSION
  0x0001: au_sequence_number
          (AU SEQUENCE NUMBER IN MPU)

<SETTING EXAMPLE>
extension_type: 0x0001
extension_length: 1
header_extension_byte: 0 TO 255 (MPU SIZE UPPER LIMIT VALUE -1)
```

FIG. 11

| DATA STRUCTURE | BIT LENGTH | DATA NOTATION |
|---|---|---|
| Header_extension_byte { | | |
| for (i=0; i<N; i++) { | | |
| hdr_ext_end_flag | 1 | bslbf |
| hdr_ext_type | 15 | uimsbf |
| hdr_ext_length | 16 | uimsbf |
| for (j=0; j<M; j++) { | | |
| hdr_ext_byte | 8 | bslbf |
| } | | |
| } | | |
| } | | |

*FIG. 12*

```
<Semantics>
hdr_ext_type
 0x0000 : au_sequence_number (AU SEQUENCE NUMBER IN MPU)
 0x0001 : SCRAMBLE VARIOUS INFORMATION PRESCRIBED IN ARIB STD-B61

<SETTING EXAMPLE>
extension_length        : 4+hdr_ext_length
    hdr_ext_end_flag    : 1
    hdr_ext_type        : 0x0000
    hdr_ext_length      : 1 TO 255 (MPU SIZE UPPER LIMIT VALUE)
        hdr_ext_byte    : n *HEAD AU SEQUENCE NUMBER IN MMTP
        hdr_ext_byte    : n+1
        hdr_ext_byte    : n+2
        ...
        hdr_ext_byte    : MPU SIZE UPPER LIMIT VALUE
```

FIG. 16

| 0 | DATA STRUCTURE | BIT LENGTH | DATA NOTATION |
|---|---|---|---|
| 1 | MPU_Extended_Timestamp_Descriptor () { | | |
| 2 | descriptor_tag | 16 | uimsbf |
| 3 | descriptor_length | 8 | uimsbf |
| 4 | reserved | 5 | bslbf |
| 5 | pts_offset_type | 2 | uimsbf |
| 6 | timescale_flag | 1 | bslbf |
| 7 | if(timescale_flag==1) { | | |
| 8 | timescale | 32 | uimsbf |
| 9 | } | | |
| 10 | if(pts_offset_type==1) { | | |
| 11 | default_pts_offset | 16 | uimsbf |
| 12 | } | | |
| 13 | for (i=0; i<N; i++) { | | |
| 14 | mpu_sequence_number | 32 | uimsbf |
| 15 | mpu_decording_time_offset | 16 | uimsbf |
| 16 | num_of_au | 8 | uimsbf |
| 17 | for (j=0; j<num_of_au; j++) { | | |
| 18 | dts_pts_offset | 16 | uimsbf |
| 19 | sample_number | 32 | uimsbf |
| 20 | if(pts_offset_type==2) { | | |
| 21 | pts_offset | 16 | uimsbf |
| 22 | } | | |
| 23 | } | | |
| 24 | } | | |
| 25 | } | | |

RECEIVING APPARATUS AND METHOD, AND TRANSMITTING APPARATUS AND METHOD

TECHNICAL FIELD

The present disclosure relates to a receiving apparatus and method, and a transmitting apparatus and method, and more particularly, to a receiving apparatus and method, and a transmitting apparatus and method capable of improving a reproduction quality in a state where a packet loss occurs.

BACKGROUND ART

In the traditional content transmission method MPEG-TS, decoding time information (decode time stamp: DTS) and display time information (presentation time stamp: PTS) are multiplexed in an Optional Field of a PES header. Therefore, an access unit (AU) included in a PES payload has performed decoding and display control in association with the PTS/DTS.

On the other hand, in a transmission method MMT used for IP transmission, a method of transmitting time information corresponding to the PTS/DTS in control information has been proposed as indicated in Patent Document 1.

Specifically, in an operation of ARIB MMT, a time stamp descriptor and an extended time stamp descriptor are described in MPT of MMT-SI. A receiver receives the time stamp descriptors and restores the PTS/DTS. At the time of restoration, the AU and the time information are uniquely associated with each other, and a head AU in a MPU is set as a starting point of the association. In addition, regarding the AUs other than the head AU in the MPU, time information described in the extension time stamp descriptor in a described order is associated with the AUs in a multiplexed order.

Furthermore, in Patent Document 1, an example is indicated in which a MFU sequence number in the MPU is described in a MFU header. However, the AU may include the plurality of MFUs, and a NAL unit other than the AU is included in the sequence. Therefore, it is difficult to correctly associate the AU with the time information by using the above example.

CITATION LIST

Patent Document

Patent Document 1: Japanese Patent Application Laid-Open No. 2015-27091

SUMMARY OF THE INVENTION

Problems to be Solved by the Invention

As described above, at present, clear information for a method of associating the AU with the time information is not provided. Therefore, according to the method of associating the AU with the time information, in a case where a packet loss occurs in a receiver in a low-quality transmission state, there has been a possibility that an error occurs in the association due to a partial lack of the AU or the time information.

The present disclosure has been made in view of such a situation, and can improve a reproduction quality in a state where a packet loss occurs.

Solutions to Problems

A transmitting apparatus according to one aspect of the present technology includes: a data encoding unit which encodes a data unit; a data packet unit which packetizes the data unit encoded by the data encoding unit and generates a data packet; a time information packet unit which packetizes time information indicating a decode and a display time relative to the data unit and generates a time information packet; and a multiplexer which multiplexes the data packet, the time information packet, and identification information to identify the data unit and generates a stream.

Data included in the data unit is at least one of video data and audio data.

The identification information is an independent counter for each sequence.

The identification information is counted in data units for each sequence.

In a case where a single packet includes a single data unit, the identification information is arranged in a packet header part.

In a case where the single packet includes the plurality of data units, the identification information is arranged in the packet header part.

The identification information for the plurality of data units is described in the packet header part.

The identification information for only a head data unit is described in the packet header part.

In a case where the single packet includes the plurality of data units, the identification information is arranged at a head of each data unit in a payload.

A transmitting method performed by a transmitting apparatus, according to one aspect of the present technology includes: encoding a data unit; packetizing the encoded data unit and generating a data packet; packetizing time information indicating a decode and a display time relative to the data unit and generating a time information packet; and multiplexing the data packet, the time information packet, and identification information to identify the data unit and generating a stream.

A receiving apparatus according to another aspect of the present technology includes: a separating unit which separates a stream in which a data packet which is an encoded and packetized data unit, a time information packet in which time information indicating a decode and a display time relative to the data unit is packetized, and identification information to identify the data unit are multiplexed; an extracting unit which extracts the encoded data unit from the data packet; a restoring unit which restores the time information from the time information packet; an associating unit which associates the encoded data unit with the time information on the basis of the identification information; and a decoding unit which decodes the encoded data unit and generates a data unit.

Data included in the data unit is at least one of video data and audio data.

The identification information is an independent counter for each sequence.

The identification information is counted in data units for each sequence.

In a case where a single packet includes a single data unit, the identification information is arranged in a packet header part.

In a case where the single packet includes the plurality of data units, the identification information is arranged in the packet header part.

The identification information for the plurality of data units is described in the packet header part.

The identification information for only a head data unit is described in the packet header part.

In a case where the single packet includes the plurality of data units, the identification information is arranged at a head of each data unit in a payload.

A receiving method, performed by a receiving apparatus, according to another aspect of the present technology includes: separating a stream in which a data packet which is an encoded and packetized data unit, a time information packet in which time information indicating a decode and a display time relative to the data unit is packetized, and identification information to identify the data unit are multiplexed; extracting the encoded data unit from the data packet; restoring the time information from the time information packet; associating the encoded data unit with the time information on the basis of the identification information; and decoding the encoded data unit and generating a data unit.

In one aspect of the present technology, a data unit is encoded, the encoded data unit is packetized to generate a data packet, and time information indicating a decode and a display time relative to the data unit is packetized to generate a time information packet. Then, the data packet, the time information packet, and the identification information to identify the data unit are multiplexed to generate a stream.

In another aspect of the present technology, a stream is separated in which a data packet which is an encoded and packetized data unit, a time information packet in which time information indicating a decode and a display time relative to the data unit is packetized, and identification information to identify the data unit are multiplexed, the encoded data unit is extracted from the data packet, and the time information is restored from the time information packet. Then, on the basis of the identification information, the encoded data unit is associated with the time information, the encoded data unit is decoded, and the data unit is generated.

Effects of the Invention

According to the present technology, it is possible to improve a reproduction quality in a state where a packet loss occurs.

Note that the effects described herein are only exemplary, and the effects of the present technology are not limited to those described herein, and additional effects may be obtained.

BRIEF DESCRIPTION OF DRAWINGS

FIG. 9 is a diagram of an exemplary configuration of an MMTP packet.

FIG. 10 is a diagram of a definition and a setting example of an extension header type.

FIG. 11 is a diagram of an exemplary configuration of a multi-type header extension.

FIG. 12 is a diagram of a definition and a setting example of the multi-type header extension.

FIG. 16 is a diagram of an exemplary configuration of the MMTP packet.

MODE FOR CARRYING OUT THE INVENTION

Embodiments of the present disclosure are described below.

<Example of Association Between PTS/DTS and AU>

Figure 1:
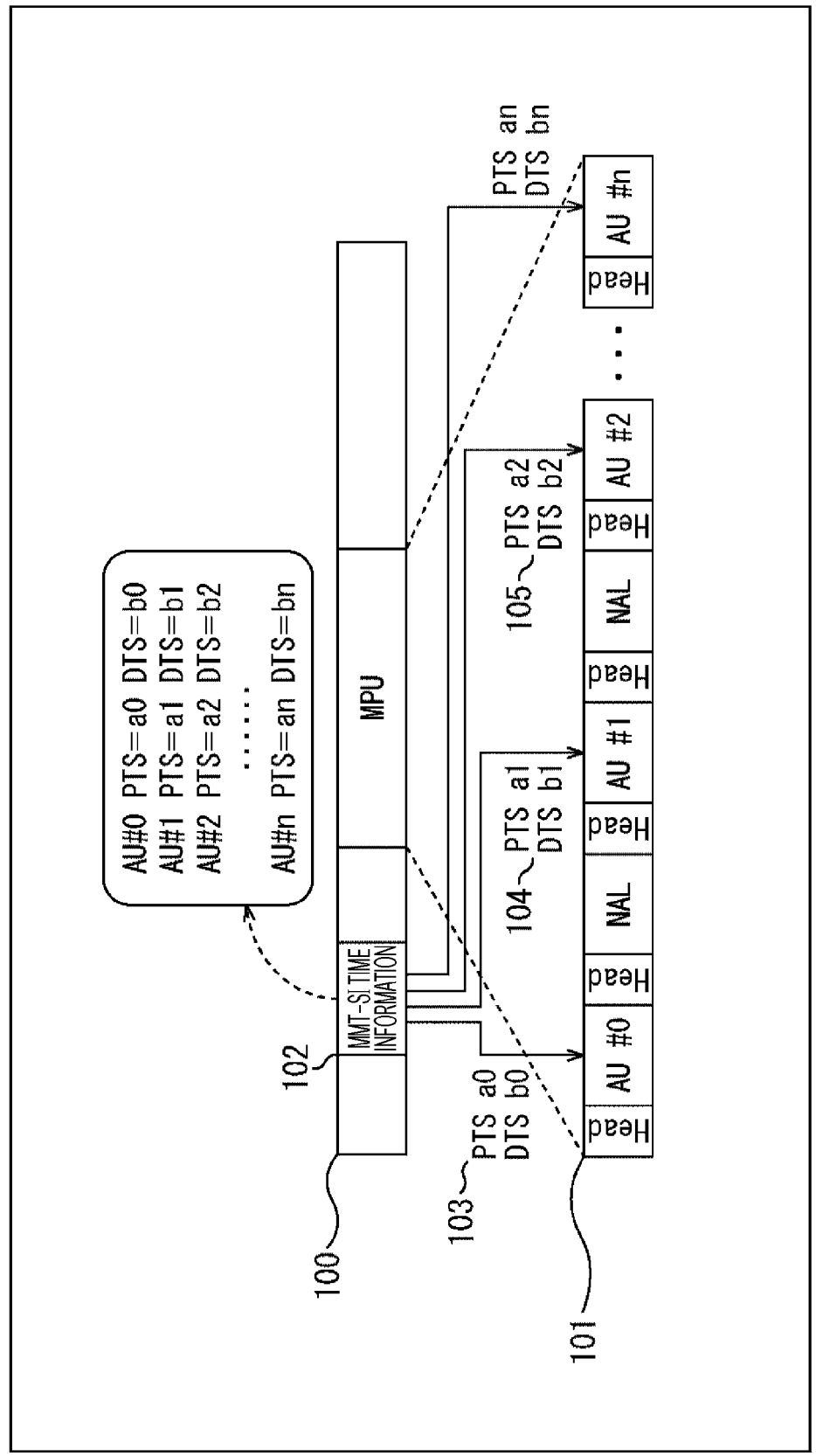
FIG. 1 is a diagram of an exemplary association between information regarding a decode/display time and an AU.

FIG. 1 is a diagram of an exemplary association between a decode time stamp (DTS)/presentation time stamp (PTS) transmitted in MMT-SI and an access unit (AU). Note that control information 100 and an IP data flow of a video/audio stream 101 may be the same or different from each other. Furthermore, the PTS/DTS are collectively referred to as time information.

In the control information 100 in FIG. 1, MMT-SI time information (MPT) 102 is stored before a MPU storing the video/audio stream 101. In the MPT 102, a time stamp descriptor and an extension time stamp descriptor are described. In the MPU, an AU #0, a NAL, an AU #1, a NAL, an AU #2, . . . , and an AU #n are stored with Headers respectively. According to the MPT 102, it is found that PTS=a0 and DTS=b0 are satisfied in the AU#0 of the MPU, PTS=a1 and DTS=b1 are satisfied in the AU #1, PTS=a2 and DTS=b2 are satisfied in the AU #2, and PTS=an and DTS=bn are satisfied in the AU #n.

A receiver receives the MMT-SI time information (MPT) 102 of the control information 100 and restores PTS of time information 103 of the head AU #0 in the MPU corresponding to MPU_sequence_number from a time stamp descriptor in the MPT 102. Next, the receiver restores DTS of the time information 103 of the head AU #0 in the MPU corresponding to MPU_sequence_number from an extension time stamp descriptor. Then, the receiver restores PTS/DTS of time information 104 and 105 of the AU #1 and the AU #2 (for the number of AUs) which has been described from dts_pts_offset and pts_offset.

Here, the AU and the time information are uniquely associated, and in the example in FIG. 1, the head AU #0 in the MPU is set as a starting point of the association. In addition, regarding the AUs other than the head AU in the MPU, time information in order described in the extension time stamp descriptor is associated with the AUs in a multiplexed order.

As described above, since clear information is not provided for a method of associating the AU with the time information, for example, in a case where a packet loss occurs in the receiver in a low-quality transmission state, there is a possibility that an error occurs in the association due to a partial lack of the AU or the time information.

Figure 2:
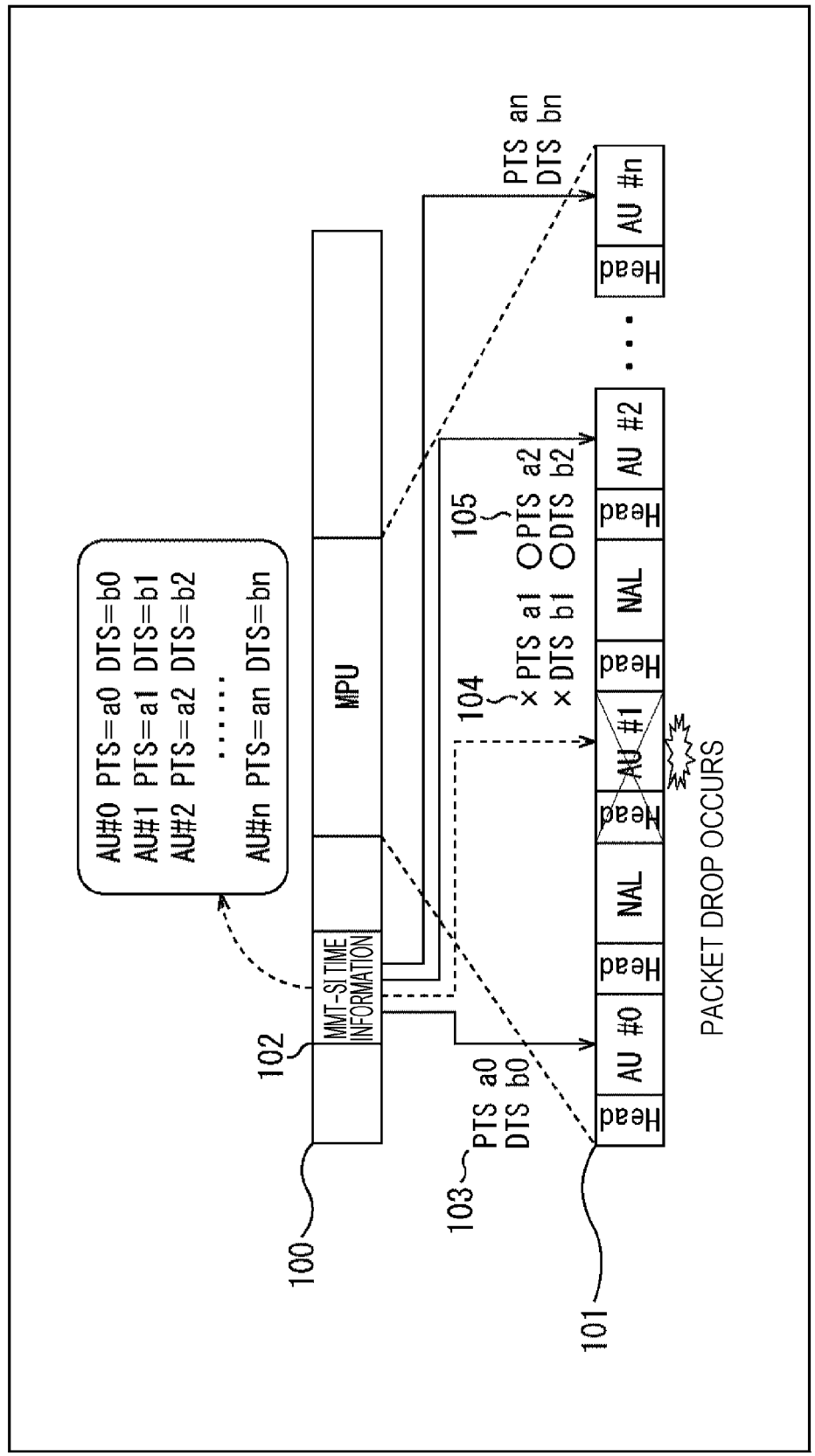
FIG. 2 is a diagram of an example at the time of a packet loss.

FIG. 2 is a diagram of an example at the time of the packet loss. In the example in FIG. 2, for example, a case where the AU #1 subsequent to the head AU #0 in the MPU cannot be extracted due to packet loss is illustrated. In this case, if there is no way to recognize the occurrence of the packet loss, when the AUs are associated after that, PTS/DTS of the time information 104 of the AU #1 is wrongly associated with the AU #2 which is not originally expected to be associated.

Then, if an error occurs in the association once in this way, the error causes errors in all the following AUs in the MPU, and it is difficult to correct the errors before a head AU in the following MPU. As a result, the display time of the AU becomes different from the assumed time, and a disturbance of a video sound may occur at the time of reproduction.

Furthermore, since the association between AU and the time information cannot be performed relative to the AU other than the head AU in the MPU, there is a risk as follows. That is, audio reproduction cannot start from an optional position in an audio frame, and this may cause a restart delay.

In a case of video, there is a restriction such that reproduction can be started from an encoding structure, for example, in a case of an AVC, the reproduction can be started from an IDR frame, and in a case of a HEVC, the reproduction can be started from a random accessible Frame such as an IRAP picture. However, since audio does not have such a restriction, it is desirable to perform reproduction from an optional position.

Figure 3:
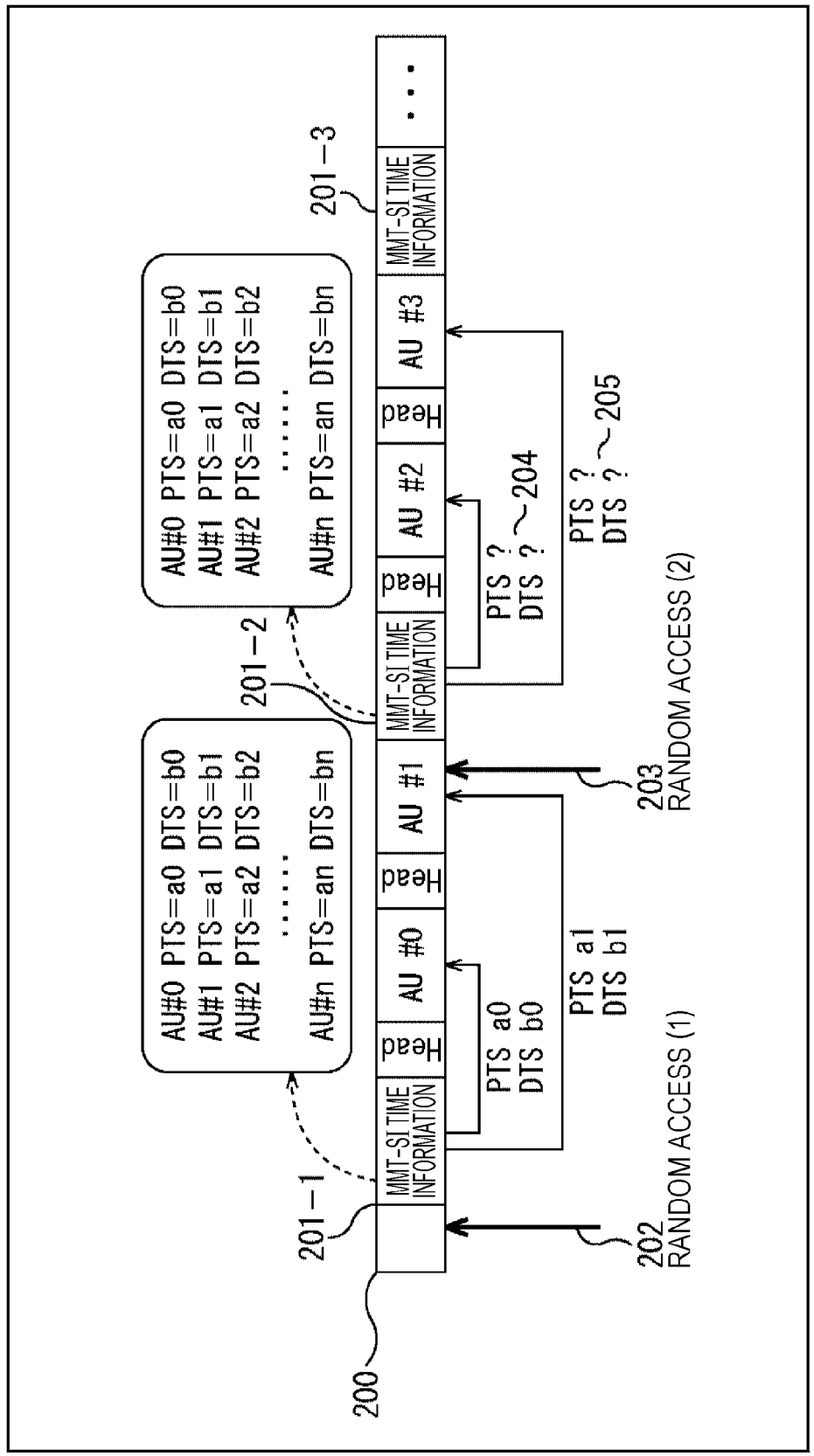
FIG. 3 is a diagram to describe a reproduction start delay.

In a stream 200 in FIG. 3, MPT 201-1 in which time information of the AU #0 and the AU #1 is described is arranged before the AU #0 and the AU #1, and MPT 201-2 in which the time information of the AU #2 and the AU #3 is described is arranged before the AU #2 and the AU #3.

For example, in a case where random access reproduction is designated at a position 202 before the reception of the head AU #0 in the MPU, time association between the received MPT 201-1 and the MPU starting with the AU #0 and reproduction from the AU #0 are possible. However, in a case where the random access reproduction is designated at a position 203 of the AU #1 which is an AU other than the head in the MPU, in the current syntax, it is not possible to determine the position of the AU #1 in the MPU. Therefore, it is difficult to associate the designated AU in the MPU with the time information.

Therefore, association cannot be performed until a head AU of the next MPU and a reproduction start delay occurs. Therefore, in the present technology, information identifying the AU is added and transmitted. The present technology is specifically described below.

<Exemplary Configuration of Transmitting Apparatus According to the Present Technology>

Figure 4:
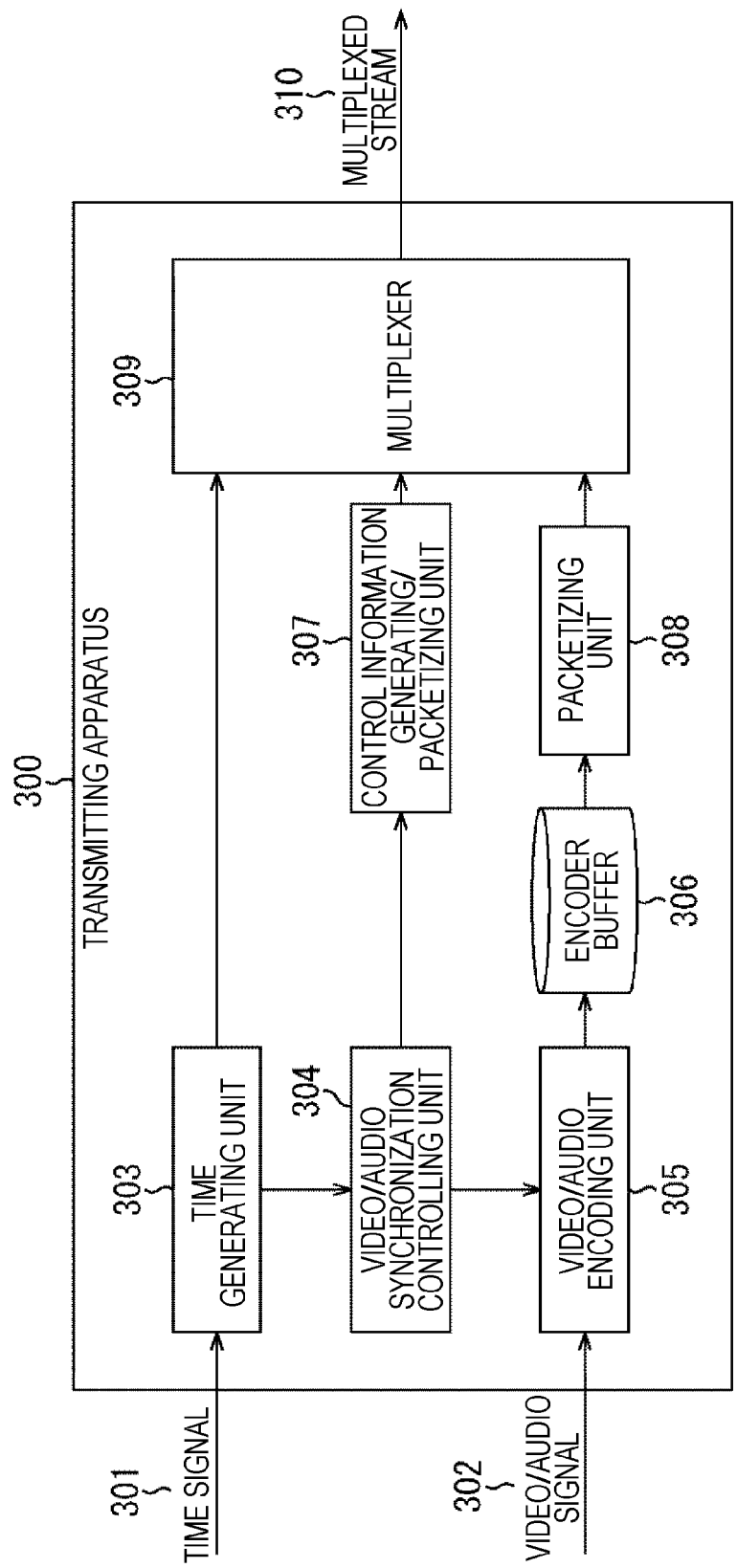
FIG. 4 is a block diagram of an exemplary configuration of a transmitting apparatus to which the present technology has been applied.

FIG. 4 is a block diagram of an exemplary configuration of a transmitting apparatus to which the present technology has been applied. The transmitting apparatus is a device which generates video/audio AUs and a decode/display time (PTS/DTS) and multiplexes them into a stream.

In the example in FIG. 4, a transmitting apparatus 300 includes a time generating unit 303, a video/audio synchronization controlling unit 304, a video/audio encoding unit 305, an encoder buffer 306, a control information generating/packetizing unit 307, a packetizing unit 308, and a multiplexer 309.

For example, on the basis of a time signal 301 from a clock which is not shown, the time generating unit 303 generates time information and supplies the generated time information to the video/audio synchronization controlling unit 304 and the multiplexer 309.

The video/audio synchronization controlling unit 304 controls synchronization of a video signal and an audio signal by the video/audio encoding unit 305 on the basis of the time information from the time generating unit 303. The video/audio synchronization controlling unit 304 supplies the time information, control information used for the synchronization, and the like to the control information generating/packetizing unit 307. With the time information and the control information used for the synchronization, the control information generating/packetizing unit 307 generates and packetizes time information of a decode/display time and the like, and outputs the packetized information to the multiplexer 309 as a control information packet.

A video/audio signal 302 is input to the video/audio encoding unit 305. Under the control of the video/audio synchronization controlling unit 304, the video/audio encoding unit 305 synchronizes and encodes the video/audio signal 302 and temporarily stores the encoded signal in the encoder buffer 306. The encoder buffer 306 stores the encoded signal. The packetizing unit 307 reads the encoded signal from the encoder buffer 306 and performs AU packetization. The packetizing unit 307 outputs a video packet and an audio packet to the multiplexer 309.

The multiplexer 309 multiplexes the video packet and the audio packet from the packetizing unit 307 and the control information packet from the control information generating/packetizing unit 307 with reference to the time information from the time generating unit 303 and outputs the packets to a subsequent stage which is not shown as a multiplexed stream 310. At that time, the multiplexer 309 generates AU identification information which is information to identify the AU (information for associating AU with time information of decode/display time), and multiplexes the AU association information to the multiplexed stream 310.

<Exemplary Configuration of Receiving Apparatus According to the Present Technology>

Figure 5:
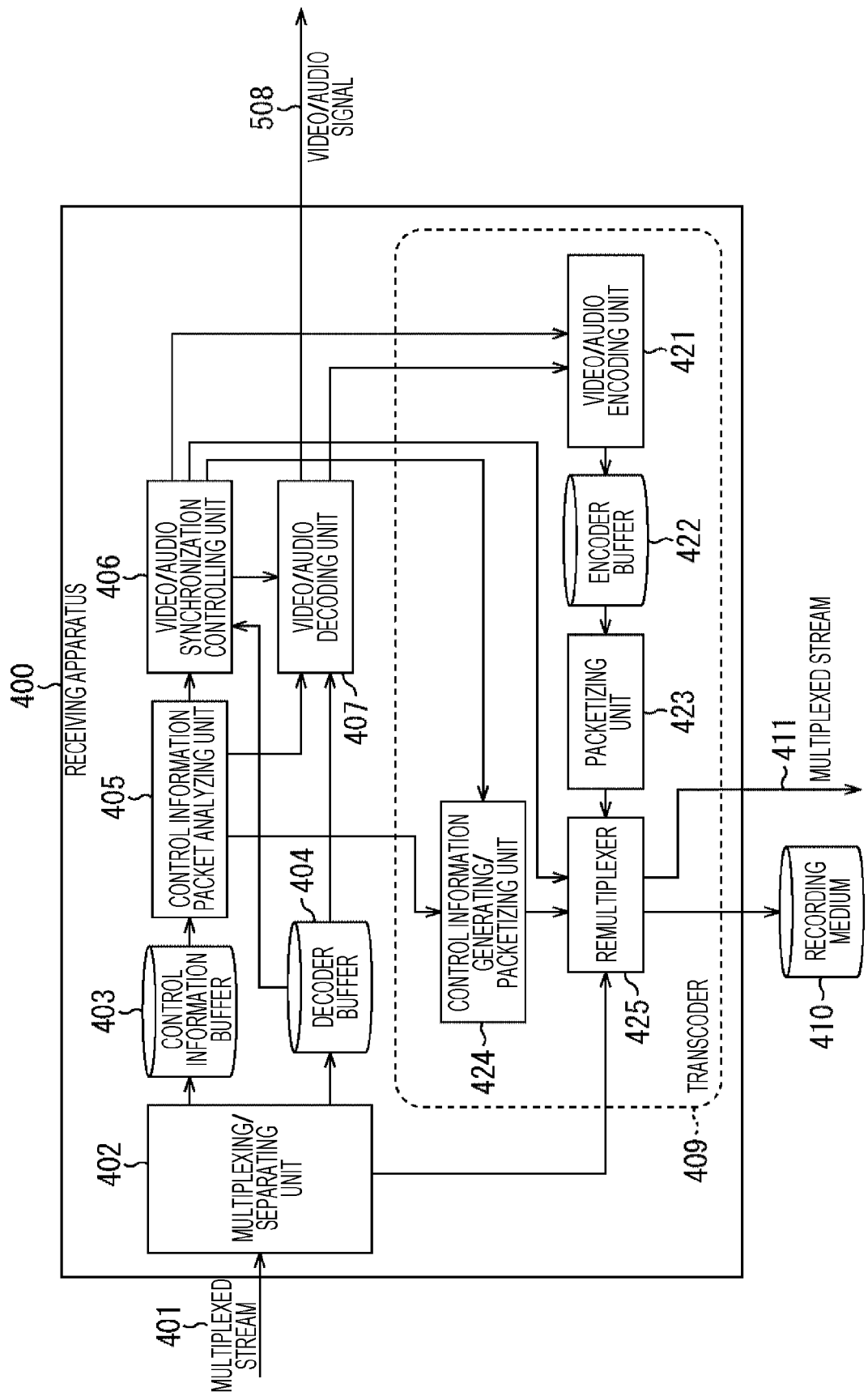
FIG. 5 is a block diagram of an exemplary configuration of a receiving apparatus to which the present technology has been applied.

FIG. 5 is a block diagram of an exemplary configuration of a receiving apparatus to which the present technology has been applied. The receiving apparatus and the transmitting apparatus described above with reference to FIG. 4 are included in a communication system for transmitting/receiving data in a transmission method used for IP transmission. The receiving apparatus receives, for example, the video/audio, the control information and the like which have been encoded and packetized by the transmitting apparatus in FIG. 4, associates the AU with the decode/display time (PTS/DTS) by using the AU identification information, and reproduces, records, or retransmits the associated information.

A receiving apparatus 400 in the example in FIG. 5 includes a multiplexing/separating unit 402, a control information buffer 403, a decoder buffer 404, a control information packet analyzing unit 405, a video/audio synchronization controlling unit 406, a video/audio decoding unit 407, and a transcoder 409. Note that the transcoder 409 is not necessarily included in the receiving apparatus 400.

The multiplexing/separating unit 402 receives a multiplexed stream 401. The multiplexing/separating unit 402 separates the multiplexed stream 401 into control information and video/audio AU. At that time, the AU identification information is also separated. The separated control information is supplied to the control information packet analyzing unit 405 via the control information buffer 403 if necessary. The control information packet analyzing unit 405 restores the time information (including PTS/DTS) from the control information packet and supplies the restored time information to the video/audio synchronization controlling unit 406 and the video/audio decoding unit 407.

On the other hand, the separated video/audio AU is supplied to the video/audio decoding unit 407 via the decoder buffer 404, together with information to identify the AU. The decoder buffer 404 supplies the video/audio AU to the video/audio decoding unit 407.

The video/audio synchronization controlling unit 406 extracts AU identification information of a target AU. Furthermore, the video/audio synchronization controlling unit 406 associates the AU with the time information of the decode/display time with reference to the time information, the control information, and the AU identification information, and makes the video/audio decoding unit 407 extract and decode the AU. A video/audio signal 508 decoded by the video/audio decoding unit 407 is output to a display control unit in a subsequent stage which is not shown and a video/audio encoding unit 421 in the transcoder 409.

Furthermore, the video/audio synchronization controlling unit 406 supplies the time information to a control information generating/packetizing unit 424 and a remultiplexer 425 in the transcoder 409.

Under the control of the video/audio synchronization controlling unit 406, the video/audio decoding unit 407 extracts the AU and decodes the AU, that is, the video/audio. The video/audio decoding unit 407 outputs the video/audio signal 508 to the display control unit in the subsequent stage which is not shown and the video/audio encoding unit 421 in the transcoder 409.

The transcoder 409 includes the video/audio encoding unit 421, an encoder buffer 422, a packetizing unit 423, the control information generating/packetizing unit 424, and the remultiplexer 425. Furthermore, in the example in FIG. 5, an example in which the transcoder 409 is arranged as a part of the receiving apparatus is illustrated. However, the transcoder 409 may be a device independent from the receiving apparatus.

Basically, the video/audio encoding unit 421, the encoder buffer 422, the packetizing unit 423, the control information generating/packetizing unit 424, and the remultiplexer 425 respectively perform similar processing to the video/audio encoding unit 305, the encoder buffer 306, the packetizing unit 308, the control information generating/packetizing unit 307, and the multiplexer 309 in FIG. 4.

That is, the video/audio encoding unit 421 re-encodes the video/audio signal 508 from the video/audio decoding unit 407 and outputs the encoded signal to the encoder buffer 422. The encoder buffer 422 outputs the encoded signal to the packetizing unit 423. The packetizing unit 423 reads the encoded signal from the encoder buffer 422, performs AU packetization, and outputs the video packet and the audio packet to the remultiplexer 425.

The control information generating/packetizing unit 424 further generates and packetizes time information of the decode/display time from the time information and the control information from the video/audio synchronization controlling unit 406, and outputs a control information packet to the remultiplexer 425.

The remultiplexer 425 remultiplexes the video packet and the audio packet from the packetizing unit 423 and the control information packet from the control information generating/packetizing unit 424 with reference to the time information from the video/audio synchronization controlling unit 406. At this time, the remultiplexer 425 generates the AU identification information and multiplexes the AU association information to a multiplexed stream 411. The remultiplexer 425 outputs the multiplexed stream 411 to a subsequent stage which is not shown for retransmission or records the multiplexed stream 411 in a recording medium 410.

<Exemplary Processing of Transmitting Apparatus>

Figure 6:
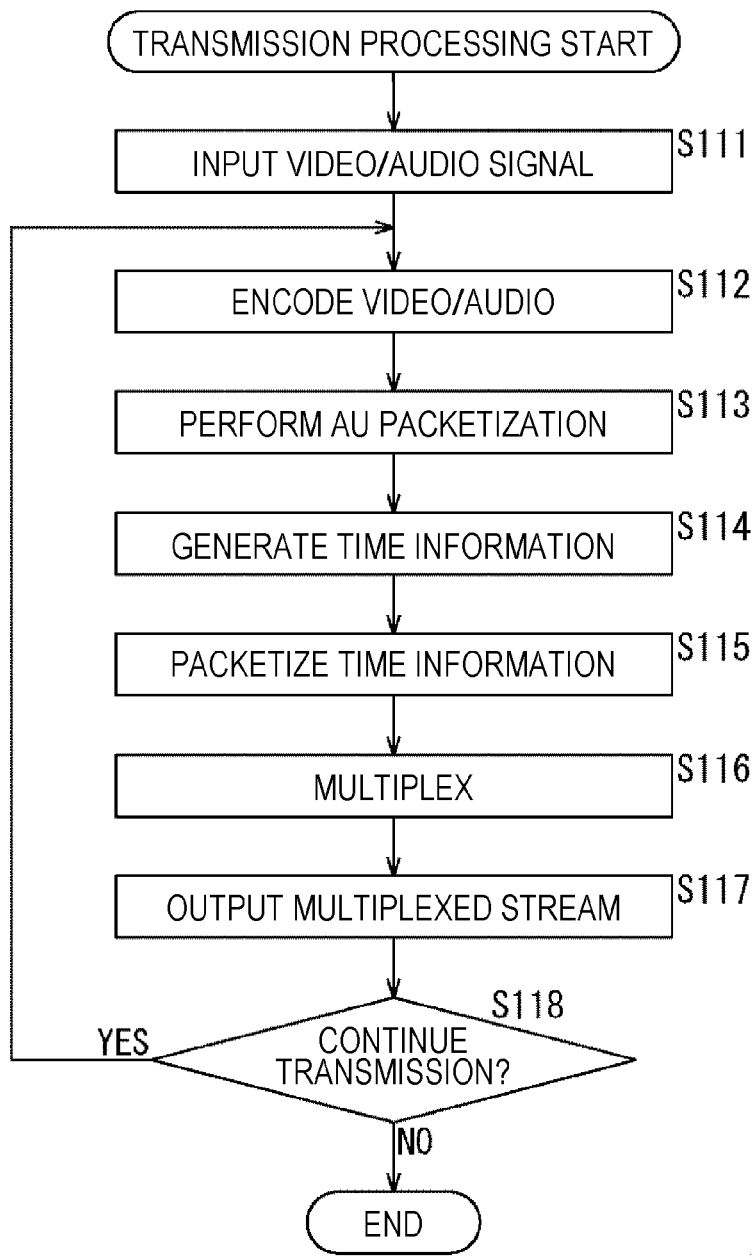
FIG. 6 is a flowchart to describe transmission processing of the transmitting apparatus.

Next, transmission processing of the transmitting apparatus 300 is described with reference to the flowchart in FIG. 6.

In step S111, the video/audio encoding unit 305 inputs a video/audio signal from outside. In step S112, under control of the video/audio synchronization controlling unit 304, the video/audio encoding unit 305 synchronizes the video signal with the audio signal and encodes the signals, and outputs the encoded signal to the packetizing unit 307 via the encoder buffer 306.

In step S113, the packetizing unit 307 reads the encoded signal from the encoder buffer 306 and performs AU packetization. The packetizing unit 307 outputs a video packet and an audio packet to the multiplexer 309.

In step S114, the control information generating/packetizing unit 307 generates the time information of the decode/display time and the like by using the time information and the control information used for synchronization. In step S115, the control information generating/packetizing unit 307 packetizes the time information of the decode/display time and outputs the packetized information to the multiplexer 309 as a control information packet.

In step S116, the multiplexer 309 multiplexes the video packet and the audio packet from the packetizing unit 307 and the control information packet from the control information generating/packetizing unit 307 with reference to the time information from the time generating unit 303. At that time, the multiplexer 309 generates AU association information which is information to identify the AU (that is, information for associating AU with decode/display time), and multiplexes the AU association information to the multiplexed stream.

In step S117, the multiplexer 309 outputs the multiplexed stream which has been multiplexed to the receiving apparatus 400.

In step S118, the video/audio encoding unit 305 determines whether to continue the transmission. In a case where it has been determined in step S118 to continue the transmission, the procedure returns to step S112, and the subsequent processing is repeated. Furthermore, in a case where it has been determined in step S118 to stop the transmission, the transmission processing is terminated.

<Exemplary Processing of Receiving Apparatus>

Figure 7:
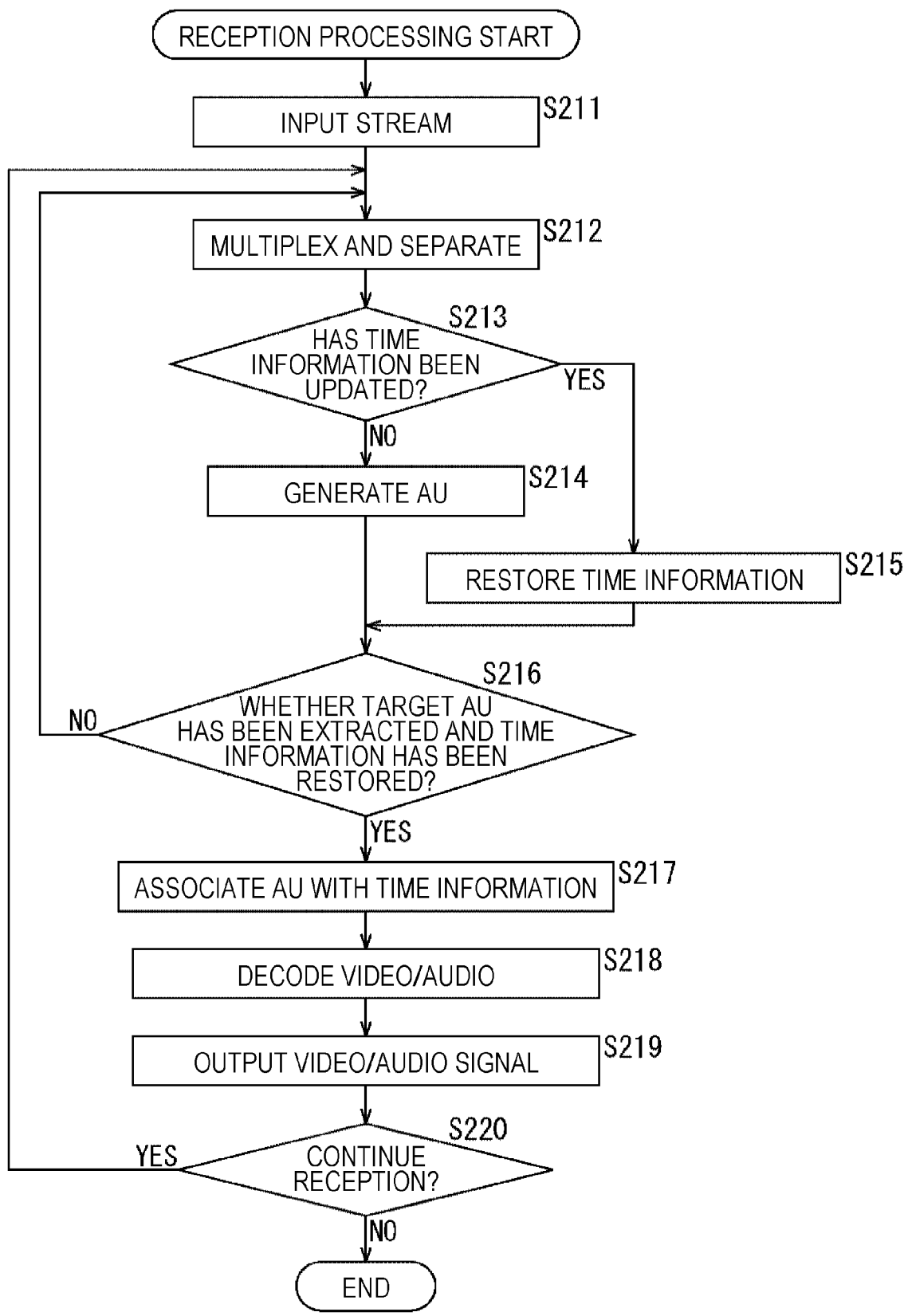
FIG. 7 is a flowchart to describe reception processing of the receiving apparatus.

Next, reception processing of the receiving apparatus 400 is described with reference to the flowchart in FIG. 7.

In step S211, the multiplexing/separating unit 402 inputs the multiplexed stream. In step S212, the multiplexing/separating unit 402 separates the multiplexed stream into the control information and the AU of video/audio. At that time, the AU identification information is also separated. The separated control information is supplied to the control information packet analyzing unit 405 via the control information buffer 403 if necessary.

In step S213, the control information packet analyzing unit 405 determines whether the time information has been updated. In a case where it has been determined in step S213 that the time information has not been updated, the procedure proceeds to step S214. In step S214, the video/audio decoding unit extracts the target AU from the decoder buffer 404. At that time, the video/audio synchronization controlling unit 406 extracts the AU identification information of the target AU.

In a case where it has been determined in step S213 that the time information has been updated, the procedure proceeds to step S215. In step S215, the control information packet analyzing unit 405 restores the time information that is determined that the time information has been updated.

In step S216, the video/audio synchronization controlling unit 406 determines whether the target AU has been extracted and the time information has been restored. In a case where it has been determined in step S216 that the target AU has been extracted and the time information has not been restored, the procedure returns to step S212, and the subsequent processing is repeated.

In a case where it has been determined in step S216 that the target AU has been extracted and the time information has been restored, the procedure proceeds to step S217. In step S217, the video/audio synchronization controlling unit 406 associates the AU with the time information by using the AU identification information.

In step S218, under the control of the video/audio synchronization controlling unit 406, the video/audio decoding unit 407 decodes the AU, that is, the video/audio. In step S219, the video/audio decoding unit 407 outputs the decoded video/audio signal to the display control unit in the subsequent stage which is not shown and the video/audio encoding unit 421 in the transcoder 409.

In step S220, the multiplexing/separating unit 402 determines whether to continue reception. In a case where it has been determined in step S220 to continue the reception, the procedure returns to step S212, and the subsequent processing is repeated. In a case where it has been determined in step S220 not to continue the reception, the reception processing is terminated.

Figure 8:
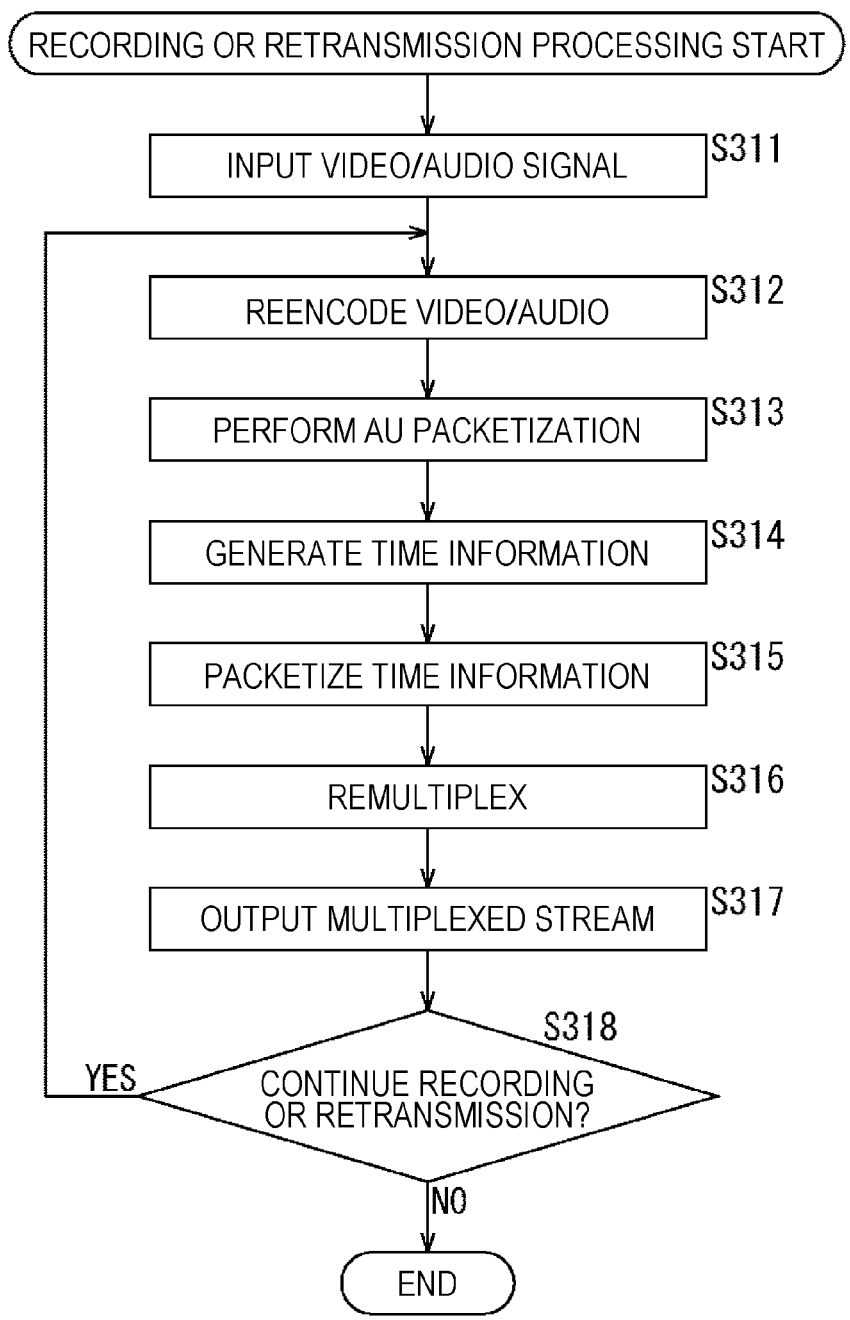
FIG. 8 is a flowchart to describe recording and retransmission processing of the receiving apparatus.

Next, recording or retransmission processing of the receiving apparatus 400 is described with reference to the flowchart in FIG. 8.

In step S311, the video/audio encoding unit 421 inputs the video/audio signal from the video/audio decoding unit 407. In step S312, under control of the video/audio synchronization controlling unit 406, the video/audio encoding unit 421 synchronizes the video signal with the audio signal and encodes the signals, and outputs the encoded signal to the packetizing unit 423 via the encoder buffer 422.

In step S313, the packetizing unit 423 reads the encoded signal from the encoder buffer 422 and performs AU packetization. The packetizing unit 423 outputs a video packet and an audio packet to the remultiplexer 425.

In step S314, the control information generating/packetizing unit 424 generates the time information of the decode/display time and the like by using the time information and the control information used for synchronization. In step S315, the control information generating/packetizing unit 424 packetizes the time information of the decode/display time and outputs the packetized information to the remultiplexer 425 as a control information packet.

In step S316, the remultiplexer 425 multiplexes the video packet and the audio packet from the packetizing unit 423 and the control information packet from the control information generating/packetizing unit 424 with reference to the time information from the video/audio synchronization controlling unit 406. At that time, the remultiplexer 425 generates the AU association information which is the information to identify the AU (information for associating AU with decode/display time), and multiplexes the AU association information to the multiplexed stream.

In step S317, the remultiplexer 425 outputs the multiplexed stream which has been multiplexed to the recording medium 410 or other receiving apparatuses.

In step S318, the video/audio encoding unit 421 determines whether to continue recording or retransmission. In a case where it has been determined in step S318 to continue the recording or the retransmission, the procedure returns to step S312, and the subsequent processing is repeated. Furthermore, in a case where it has been determined in step S318 to stop the recording or the retransmission, the recording or retransmission processing is terminated.

<Association Between Time Information and AU>

First, as an example of an association between the time information and the AU, a method 1 using a counter for each AU is described. For example, in the example in FIG. 9, a MMTP packet configuration defined in ARIB MMT is illustrated. Furthermore, the numbers on the left are provided for convenience of description. In the example in FIG. 10, a definition and a setting example of an extension header type are illustrated.

As illustrated in the example in FIG. 9, in a MMTP packet header, in a case where it is assumed that extension_flag=1 in the sixth row from the top be satisfied, the configuration is defined in which description regarding an extension header can be made in the 16th row to the 22nd row. As the method 1, this is used to newly define a type of an AU sequence number in extension_type, and the AU sequence number included in the MMTP packet is described in header_extension_byte.

Note that since packet_sequence_number in the twelfth row is not only used for the AU but also for a NAL unit in order, packet_sequence_number cannot be used for this method.

In addition, a method 2 is described. For example, in the example in FIG. 11, a configuration of the multi-type header extension defined in ARIB MMT is illustrated. In the example in FIG. 12, a definition and a setting example of the multi-type header extension are illustrated.

The multi-type header extension can be used when extension_type=0x0000 in FIG. 10 is designated. By using the multi-type header extension, as illustrated in FIG. 12, hdr_ext_type=0x0000 can be defined as au_sequence_number, and sequence numbers of all the AUs included in the MMTP packet can be described in hdr_ext_byte.

Here, for example, the AU sequence number is defined as follows.

1. Set as an independent counter for each MPU sequence.
2. Count up in AU units for each MPU sequence.
3. Add a counter at the head AU of the MPU.
4. The NAL units other than the AU are excluded.

Figure 13:
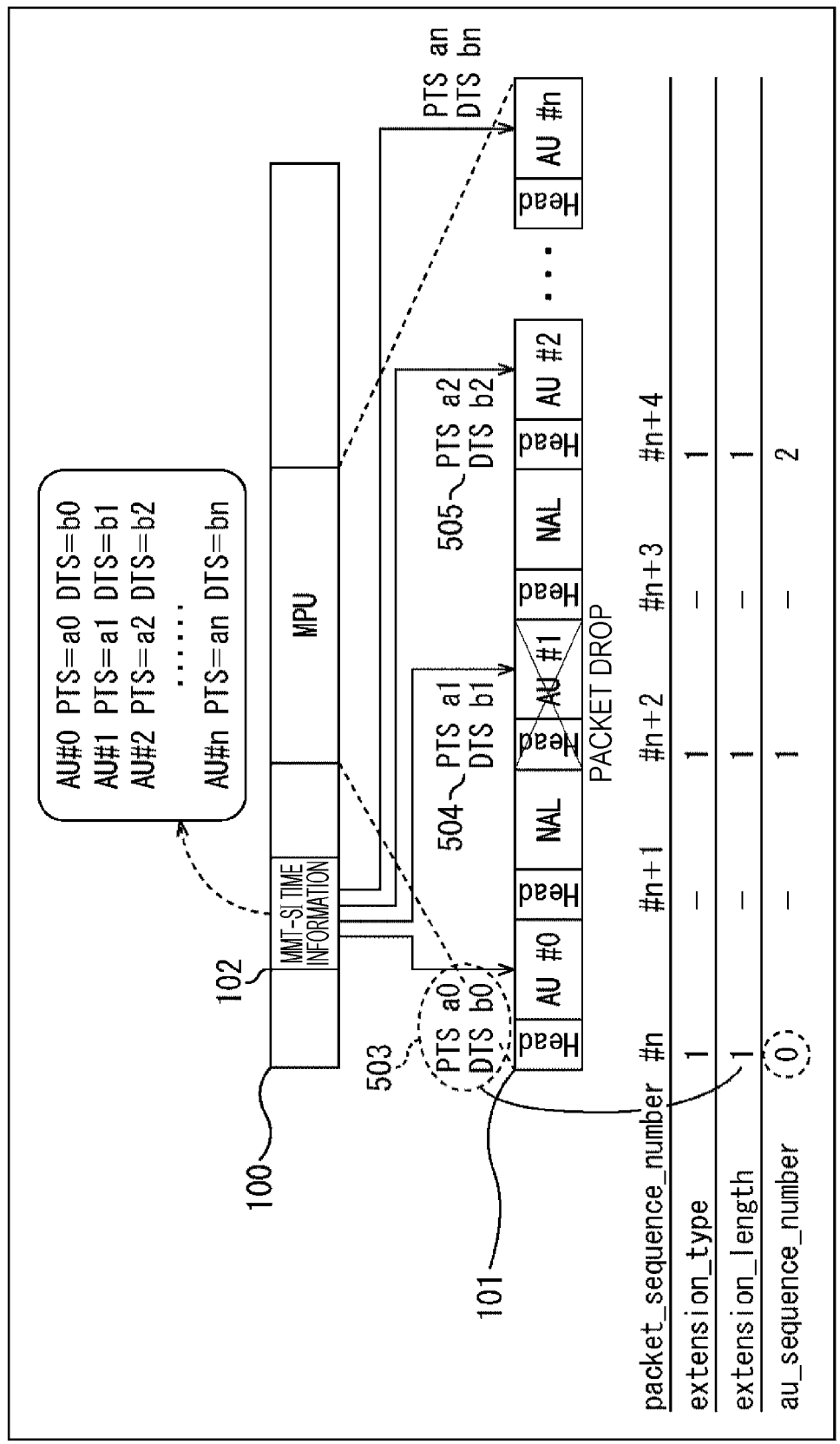
FIG. 13 is a diagram of an example in which a method 1 is used in a stream according to the present technology.

FIG. 13 is a diagram of an example in which the method 1 is used in the stream according to the present technology. In the example in FIG. 13, as in FIG. 1, an example in which a single AU is included per MMTP packet is illustrated.

In the example in FIG. 13, in the MMTP packet header of the AU #0, packet_sequence_number is #n, extension_type is 1, extension_length is 1, and au_sequence_number is 0. In the MMTP packet header of the NAL, packet_sequence_number is #n+1, extension_type, extension_length, and au_sequence_number are not described.

In the MMTP packet header of the AU #1, packet_sequence_number is #n+2, extension_type is 1, extension_length is 1, and au_sequence_number is 1. In the MMTP packet header of the NAL, packet_sequence_number is #n+3, extension_type, extension_length, and au_sequence_number are not described. In the MMTP packet header of the AU #2, packet_sequence_number is #n+4, extension_type is 1, extension_length is 1, and au_sequence_number is 2.

Since the PTS/DTS can be recognized from the acquired MPT 102, association can be made such that PTS=a0 and DTS=b0 are satisfied in the time information 503 of the AU (AU #0) of which au_sequence_number is 0, PTS=a1 and DTS=b1 are satisfied in the time information 504 of the AU (AU #1) of which au_sequence_number is 1, and PTS=a2 and DTS=b2 are satisfied in the time information 505 of the AU (AU #2) of which au_sequence_number is 2.

Therefore, in the example in FIG. 1, since it has been difficult to detect the occurrence of the packet loss, there have been some cases where the AU is wrongly associated with the PTS/DTS. Whereas, in the example in FIG. 13, the packet loss in the AU #1 can be detected with reference to the AU sequence numbers of the AU #0 and the AU #2. As a result, it is possible to correctly associate the time information 505 of the AU #2 with PTS=a2 and DTS=b2.

Figure 14:
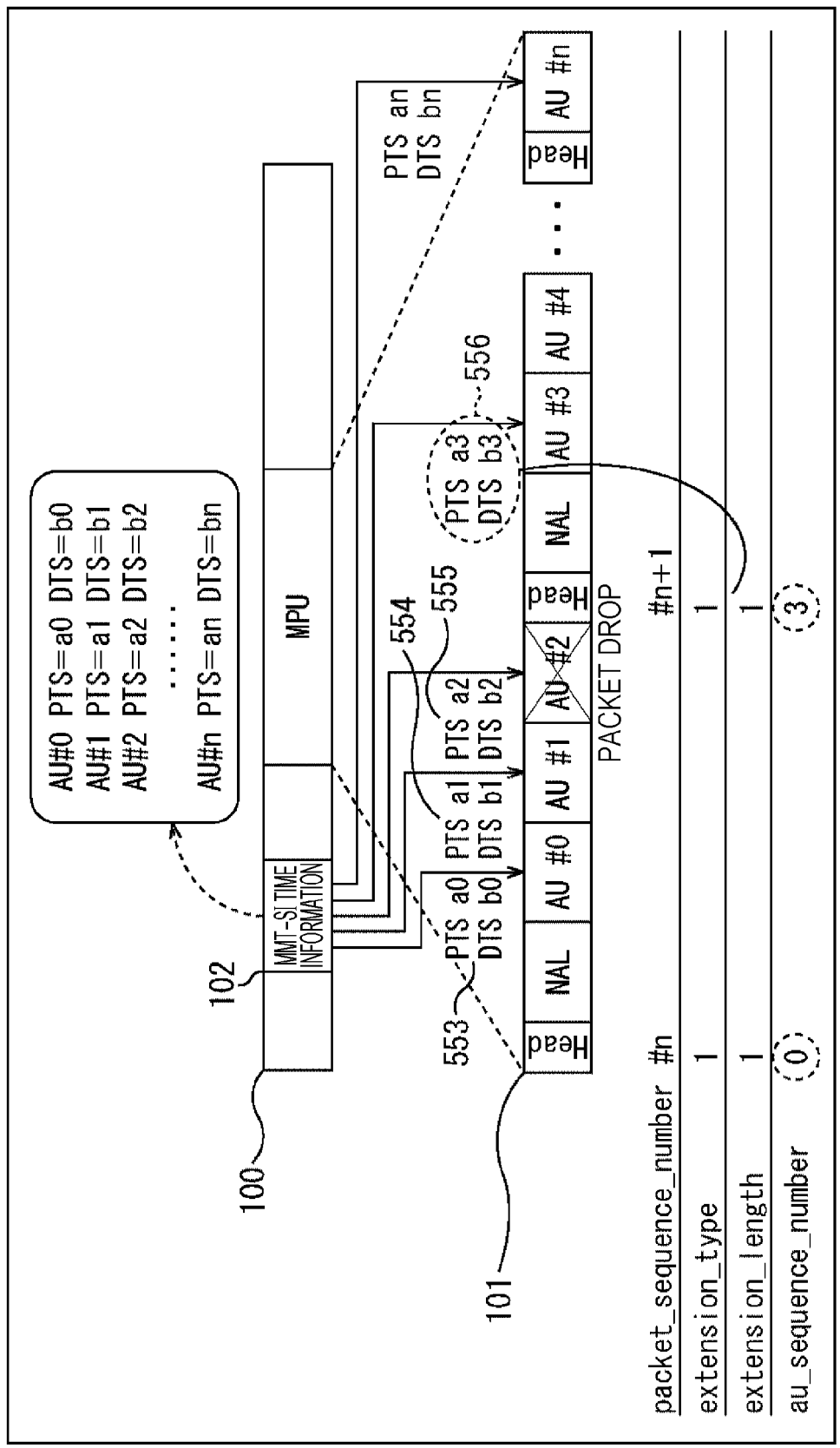
FIG. 14 is a diagram of an example in which the method 1 is used in the stream according to the present technology.

FIG. 14 is a diagram of an example in which the method 1 is used in the stream according to the present technology. In the example in FIG. 14, an example is illustrated in which a plurality of AUs is included per MMTP packet. Furthermore, in this case, as described above, it is possible to describe the sequence numbers of plural AUs by using the multi-type header extension (method 2). However, as illustrated in FIG. 14, to reduce information amount, only an AU arranged at the head of the MMTP packet (including head of AU) may be described in an extension region of the MMTP packet header.

In the example in FIG. 14, packet_sequence_number is applied only to the head AU of the MMTP packet from the left. Therefore, in the MMTP packet header of the NAL, the AU #0, the AU #1, and the AU #2 in order from the left, packet_sequence_number is #n, extension_type is 1, extension_length is 1, and au_sequence_number is 0.

In the MMTP packet header of the NAL, the AU #3, the AU #4, and . . . , packet_sequence_number is #n+1, extension_type is 1, extension_length is 1, and au_sequence_number is 3.

The PTS/DTS is recognized from the acquired MPT 102. Therefore, since the AU #0 is the first AU in the MMTP packet of which au_sequence_number is 0, PTS=a0 and DTS=b0 are satisfied in time information 553. Furthermore, since the AU #1 is the second AU in the MMTP packet of which au_sequence_number is 0, PTS=a1 and DTS=b1 are satisfied in time information 554. Furthermore, since the AU #2 is the third AU in the MMT packet of which au_sequence_number is 0, PTS=a2 and DTS=b2 are satisfied in time information 555. Since the AU #3 is the first AU in the MMTP packet of which au_sequence_number is 3, time information 556 is associated with PTS=a3 and DTS=b3.

In the case of FIG. 14, the AU can be correctly associated with the time information with reference to the AU sequence numbers of the AU #0 and AU #2. Therefore, for example, even if the AU #2 cannot be extracted due to a packet drop, the time information 556 of the next head AU #3 of the MMTP packet can be associated.

<Other Association Between Time Information and AU>

Next, a method 2 is described in which a sequence number for each AU used to associate the time information with the AU is added in the MMTP payload. For example, with the method of describing the AU sequence number in a MMTP packet header part, as described above with reference to FIG. 14, in a case where the plurality of AUs is arranged in the single MMTP, there are some cases where the AU and the time information are not correctly associated with each other in the MMTP.

For example, in the example in FIG. 14, in a case where the AU #0 lacks, association of the AU #1 and the AU #2 cannot be made.

Figure 15:
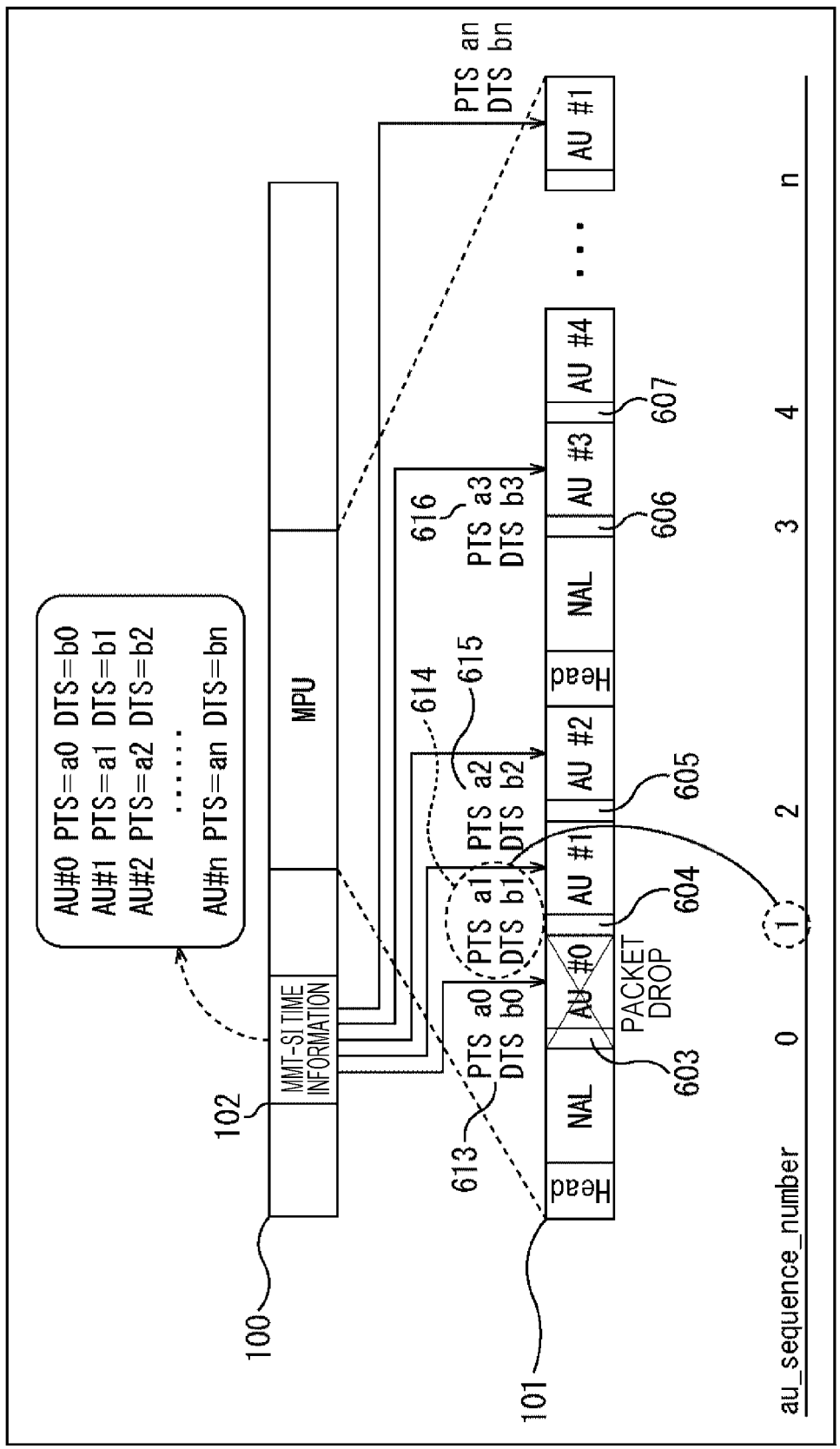
FIG. 15 is a diagram of an example in which an AU sequence number is added before an AU data head part in a MMTP payload.

Therefore, as illustrated in FIG. 15, it is also considered to add an AU sequence number before the AU data head part in the MMTP payload. In the example in FIG. 15, in the head MMTP, au_sequence_number=0 is described at a position 603 before a data head part of the AU #0, au_sequence_number=1 is described at a position 604 before a data head part of the AU #1, and au_sequence_number=2 is described at a position 605 before a data head part of the AU #2. In the head of the next MMTP, au_sequence_number=3 is described at a position 606 before a data head part of the AU #3, and au_sequence_number=4 is described at a position 607 before a data head part of the AU #4.

Since the PTS/DTS can be recognized from the acquired MPT 102, association can be made such that PTS=a0 and DTS=b0 are satisfied in the time information 613 of the AU (AU #0) of which au_sequence_number described at the position 603 is 0, PTS=a1 and DTS=b1 are satisfied in the time information 614 of the AU (AU #1) of which au_sequence_number described at the position 604 is 1, and PTS=a2 and DTS=b2 are satisfied in the time information 615 of the AU (AU #2) of which au_sequence_number described at the position 605 is 2.

Accordingly, for example, even if the AU #0 lacks, the time information 614 of the AU (AU #1) can be associated with PTS=a1 and DTS=b1 with reference to au_sequence_number at the position 604 in which 1 is described.

<Modification 1>

As an example of implementation, an example has been described in which the AU sequence number is added to an extension header region pf the MMTP packet header or a MMTP packet payload region. However, the present technology can be applied by adding the information for associating the AU with the time information to other metadata and control information on a stream.

In addition, the MMTP configuration described in the standard ARIB STD-B60 is described as an example of the MMTP packet configuration. The present technology can be applied to any configurations based on the other MMT.

<Modification 2>

In addition to the AU sequence number, a syntax sample_number in the MMTP payload header defined in the MMTP can be used to associate the AU with the time information. According to ARIB STD-B60, for example, a semantics of the parameter is defined as "indicating sample number of MFU". Therefore, in a case of video, since the NAL unit other than the AU is also counted, it is difficult to accurately detect the packet loss of the AU, and the syntax sample_number is not suitable for the video.

However, regarding audio, since no NAL unit other than the AU is included, this can be used as an association method. Accordingly, it is possible to cope with the start of reproduction from an optional position in an audio frame in audio reproduction.

In this case, it is necessary to use sample_number as follows.

1. Set as an independent counter for each MPU sequence.
2. Reset the counter at the head AU of the MPU.
3. The number of audio AUs included in the MPU is fixed and is a number that can divide the wrap around number of sample_number (the number of AAUs with fixed sample_number % is set as AU number in MPU).

<Modification 3>

As a method of associating the AU with the time information, a method of adding the counter to the control information side, not the video/audio stream side, can be considered.

FIG. 16 is a diagram of an exemplary configuration of the MMTP packet. Furthermore, the numbers on the left are provided for convenience of description.

Specifically, as indicated in the 19th row, a counter which can identify the AU such as the syntax sample_number in the MMTP payload header and packet_counter in the MMTP packet header is added to the extension time stamp descriptor, and the association may be made in the control information.

As described above, in the present technology, the counter for identifying the AU (more specifically, associate AU with time information) is multiplexed in the transmission and recording side, and association is made from the time information extracted from the control information on the reception side and the counter for identifying the AU.

Thus, according to the present technology, even in a state where the transmission quality is low and the packet loss occurs, it is possible to detect the packet loss on the reception side and associate the AU with the time information. As a result, time discontinuity at the time of video and audio reproduction can be prevented, and the reproduction quality can be improved.

Furthermore, in the audio reproduction, the audio reproduction can be started at an optional position in the audio frame, and the reproduction start delay can be prevented and avoided.

<Personal Computer>

The above-mentioned series of processing can be executed by hardware and software. In a case where the series of the processing is executed by the software, a program included in the software is installed to a computer. Here, the computer includes a computer incorporated in dedicated hardware, a general personal computer which can perform various functions by installing various programs, and the like.

Figure 17:
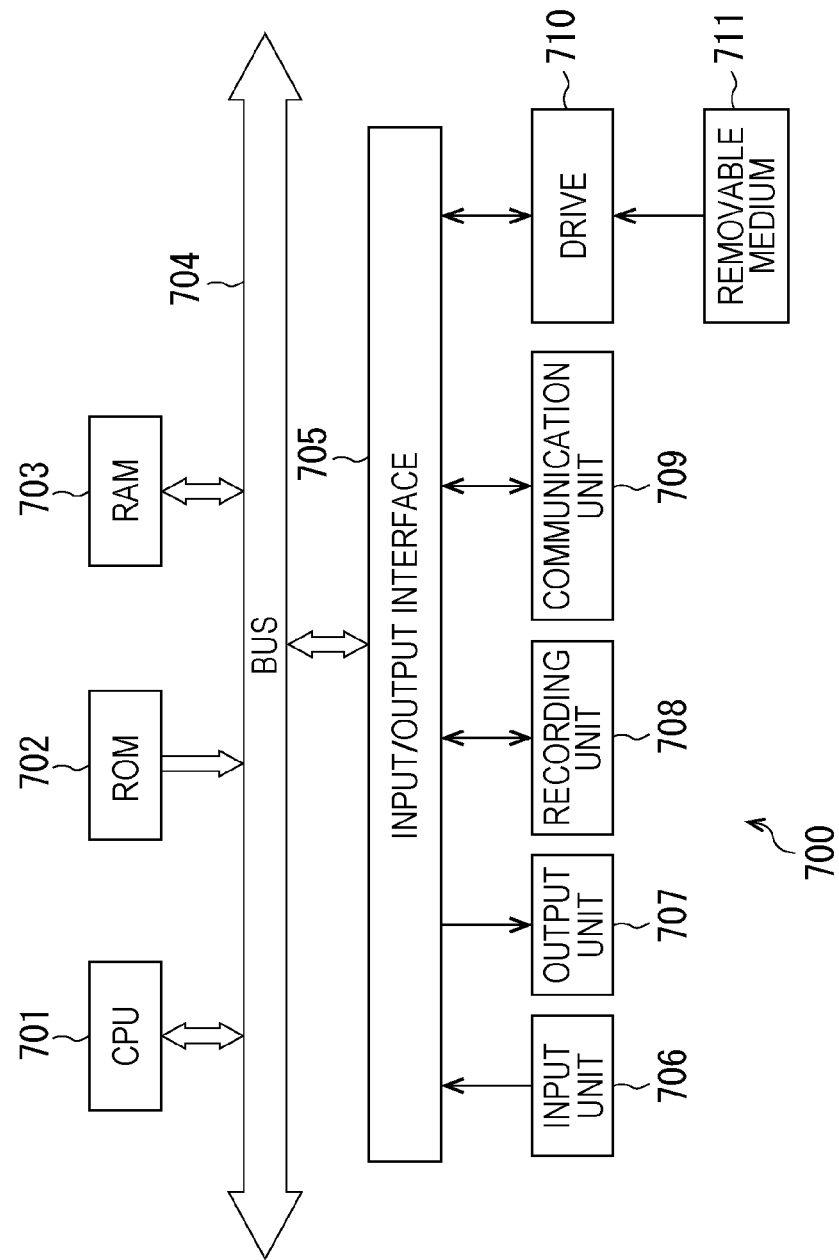
FIG. 17 is a block diagram of an exemplary configuration of a personal computer.

FIG. 17 is a block diagram of an exemplary configuration of hardware of a personal computer for executing the above-mentioned series of processing by the program.

In a personal computer 700, a central processing unit (CPU) 701, a read only memory (ROM) 702, and a random access memory (RAM) 703 are connected to each other with a bus 704.

In addition, an input/output interface 705 is connected to the bus 704. An input unit 706, an output unit 707, a storage unit 708, a communication unit 709, and a drive 710 are connected to the input/output interface 705.

The input unit 706 includes a keyboard, a mouse, a microphone, and the like. The output unit 707 includes a display, a speaker, and the like. The storage unit 708 includes a hard disk, a non-volatile memory, and the like. The communication unit 709 includes a network interface and the like. The drive 710 drives a removable medium 711 such as a magnetic disk, an optical disk, an optical magnetic disk, or a semiconductor memory.

In the personal computer 700 configured as above, the CPU 701 loads, for example, the program stored in the storage unit 708 to the RAM 703 via the input/output interface 705 and the bus 704 and executes the program. As a result, the series of processing described above is performed.

The program executed by the computer (CPU 701) can be recorded and provided on the removable medium 711. The removable medium 711 is a package media and the like, for example, including a magnetic disk (including flexible disk), an optical disk (compact disc-read only memory (CD-ROM), digital versatile disc (DVD), and the like), an optical magnetic disk, or a semiconductor memory. Furthermore, alternatively, the program can be provided via a wired or wireless transmission media such as a local area network, the internet, and digital satellite broadcasting.

In the computer, the program can be installed to the storage unit 708 via the input/output interface 705 by mounting the removable medium 711 in the drive 710. Furthermore, the program can be received by the communication unit 709 via the wired or wireless transmission media and installed to the storage unit 708. In addition, the program can be previously installed to the ROM 702 and the storage unit 708.

Note that, the program executed by the computer may be a program in which processing is performed along the order described herein in time series and a program in which the processing is performed in parallel or at a necessary stage when a call has been performed and the like.

Furthermore, here, a step for writing the program recorded in the recording media includes processing performed along the described order in time series and processing performed in parallel or independently even when the processing is not performed in time series.

Furthermore, in the present specification, the system indicates a whole device including a plurality of devices (apparatus).

In addition, the embodiment of the present disclosure is not limited to the embodiment described above and can be variously changed without departing from the scope of the present disclosure.

Furthermore, the configuration described above as a single device (or processing unit) may be divided, and the divided parts may form a plurality of devices (or processing unit). Conversely, the configuration described above as a plurality of devices (or processing unit) may be collectively configured as a single device (or processing unit). Furthermore, a configuration other than the configuration described above may be added to the configuration of each device (or each processing unit). In addition, when the configuration and the operation as a whole system are substantially the same, a part of the configuration of a device (or processing unit) may be included in the configuration of the other device (or other processing unit). That is, the present technology is not limited to the above-mentioned embodiment, and various changes can be made without departing from the scope of the present technology.

A preferred embodiment of the present disclosure has been described in detail above with reference to the drawings. However, the present disclosure is not limited to the examples. It is obvious that a person who has normal knowledge in the technical field to which the present disclosure belongs can easily arrive at various variations and modifications in the scope of the technical ideas described in claims. It is understood that the variations and modifications naturally belong to the technical scope of the present disclosure.

Note that, the present technology can have the configuration below.

(1) A transmitting apparatus including: a data encoding unit configured to encode a data unit;

a data packet unit configured to packetize the data unit encoded by the data encoding unit and generate a data packet;

a time information packet unit configured to packetize information indicating a decode and a display time relative to the data unit and generate a time information packet; and a multiplexer configured to multiplex the data packet, the time information packet, and identification information to identify the data unit and generate a stream.

(2) The transmitting apparatus according to (1), in which data included in the data unit is at least one of video data and audio data.

(3) The transmitting apparatus according to (1) or (2), in which the identification information is an independent counter for each sequence.

(4) The transmitting apparatus according to (3), in which the identification information is counted in data units for each sequence.

(5) The transmitting apparatus according to any one of (1) to (4), in which in a case where a single packet includes a single data unit, the identification information is arranged in a packet header part.

(6) The transmitting apparatus according to any one of (1) to (4), in which in a case where the single packet includes the plurality of data units, the identification information is arranged in a packet header part.

(7) The transmitting apparatus according to (6), in which the identification information for the plurality of data units is described in the packet header part.

(8) The transmitting apparatus according to (6), in which the identification information for only a head data unit is described in the packet header part.

(9) The transmitting apparatus according to any one of (1) to (4), in which in a case where the single packet includes the plurality of data units, the identification information is arranged at a head of each data unit in a payload.

(10) A transmitting method performed by a transmitting apparatus, the method including:

encoding a data unit;

packetizing the encoded data unit and generating a data packet;

packetizing time information indicating a decode and a display time relative to the data unit and generating a time information packet; and multiplexing the data packet, the time information packet, and identification information to identify the data unit and generating a stream.

(11) A receiving apparatus including:

a separating unit configured to separate a stream in which a data packet which is an encoded and packetized data unit, a time information packet in which time information indicating a decode and a display time relative to the data unit is packetized, and identification information to identify the data unit are multiplexed;

an extracting unit configured to extract the encoded data unit from the data packet;

a restoring unit configured to restore the time information from the time information packet;

an associating unit configured to associate the encoded data unit with the time information on the basis of the identification information; and a decoding unit configured to decode the encoded data unit and generate a data unit.

(12) The receiving apparatus according to (11), in which data included in the data unit is at least one of video data and audio data.

(13) The receiving apparatus according to (11) or (12), in which the identification information is an independent counter for each sequence.

(14) The receiving apparatus according to (13), in which the identification information is counted in data units for each sequence.

(15) The receiving apparatus according to any one of (11) to (14), in which in a case where a single packet includes a single data unit, the identification information is arranged in a packet header part.

(16) The receiving apparatus according to any one of (11) to (14), in which in a case where the single packet includes the plurality of data units, the identification information is arranged in a packet header part.

(17) The receiving apparatus according to (16), in which the identification information for the plurality of data units is described in the packet header part.

(18) The receiving apparatus according to (16), in which the identification information for only a head data unit is described in the packet header part.

(19) The receiving apparatus according to any one of (11) to (14), in which in a case where the single packet includes the plurality of data units, the identification information is arranged at a head of each data unit in a payload.

(20) A receiving method performed by a receiving apparatus, the method including:

separating a stream in which a data packet which is an encoded and packetized data unit, a time information packet in which time information indicating a decode and a display time relative to the data unit is packetized, and identification information to identify the data unit are multiplexed;

extracting the encoded data unit from the data packet;

restoring the time information from the time information packet;

associating the encoded data unit with the time information on the basis of the identification information; and decoding the encoded data unit and generating a data unit.

REFERENCE SIGNS LIST

300 Transmitting apparatus
303 Time generating unit
304 Video/audio synchronization controlling unit
305 Video/audio encoding unit
306 Encoder buffer
307 Control information generating/packetizing unit
308 Packetizing unit
309 Multiplexer
400 Receiving apparatus
402 Multiplexing/separating unit
403 Control information buffer
404 Decoder buffer
405 Control information packet analyzing unit
406 Video/audio synchronization controlling unit
407 Video/audio decoding unit
409 Transcoder
421 Video/audio encoding unit
422 Encoder buffer
423 Packetizing unit
424 Control information generating/packetizing unit
425 Remultiplexer

The invention claimed is:

1. A transmitting apparatus comprising:
a memory; and
an electronic processor communicatively connected to the memory, the electronic processor configured to
receive a data signal,
encode a data unit supplied by the data signal,
generate a data packet by packetizing the data unit that is encoded,
receive a time signal,
generate a time information packet by packetizing information indicating a decode and a display time relative to the data unit, the time information packet based on time information supplied by the time signal, and
generate a stream by multiplexing the data packet, the time information packet, and identification information that identifies an association between the data unit and the time information packet,
wherein the time information packet is separate from the data packet.

2. The transmitting apparatus according to claim 1, wherein
data included in the data unit is a combination of video data and audio data.

3. The transmitting apparatus according to claim 1, wherein
the identification information is an independent counter for each sequence.

4. The transmitting apparatus according to claim 3, wherein
the identification information is counted in a plurality of data units for the each sequence.

5. The transmitting apparatus according to claim 4, wherein
in a case where a single packet includes a single data unit, the identification information is arranged in a packet header part.

6. The transmitting apparatus according to claim 4, wherein
in a case where a single packet includes the plurality of data units, the identification information is arranged in a packet header part.

7. The transmitting apparatus according claim 6, wherein the identification information for the plurality of data units is described in the packet header part.

8. The transmitting apparatus according to claim 6, wherein
the identification information for only a head data unit is described in the packet header part.

9. The transmitting apparatus according to claim 4, wherein
in a case where a single packet includes the plurality of data units, the identification information is arranged at a head of each data unit in a payload.

10. A transmitting method performed by a transmitting apparatus, the method comprising:
receiving, with an electronic processor of the transmitting apparatus, a data signal;
encoding, with the electronic processor, a data unit supplied by the data signal;
generating, with the electronic processor, a data packet by packetizing the encoded data unit;
receiving, with the electronic processor, a time signal;
generating, with the electronic processor, a time information packet by packetizing time information indicating a decode and a display time relative to the data unit, the time information packet based on time information supplied by the time signal; and
generating, with the electronic processor, a stream by multiplexing the data packet, the time information packet, and identification information that identifies an association between the data unit and the time information,
wherein the time information packet is separate from the data packet.

11. A receiving apparatus comprising:
a memory; and
an electronic processor communicatively connected to the memory, the electronic processor is configured to
demultiplex a data packet including a data unit that is encoded, a time information packet including time information that is indicative of a decode and a display time relative to the data unit, and identification information that identifies an association between the data unit and the time information from a stream,
extract the data unit that is encoded from the data packet;
restore the time information from the time information packet,
associate the data unit that is encoded with the time information based on the identification information, and
generate a second data unit by decoding the data unit that is encoded,
wherein the time information packet is separate from the data packet.

12. The receiving apparatus according to claim 11, wherein
data included in the data unit is a combination of video data and audio data.

13. The receiving apparatus according to claim 11, wherein
the identification information is an independent counter for each sequence.

14. The receiving apparatus according to claim 13, wherein
the identification information is counted in a plurality of data units for the each sequence.

15. The receiving apparatus according to claim 14, wherein
in a case where a single packet includes a single data unit, the identification information is arranged in a packet header part.

16. The receiving apparatus according to claim 14, wherein
in a case where a single packet includes the plurality of data units, the identification information is arranged in a packet header part.

17. The receiving apparatus according claim 16, wherein
the identification information for the plurality of data units is described in the packet header part.

18. The receiving apparatus according to claim 16, wherein
the identification information for only a head data unit is described in the packet header part.

19. The receiving apparatus according to claim 14, wherein
in a case where a single packet includes the plurality of data units, the identification information is arranged at a head of each data unit in a payload.

20. A receiving method performed by a receiving apparatus, the method comprising:

demultiplexing, with an electronic processor of the receiving apparatus, a data packet including a data unit that is encoded, a time information packet including time information that is indicative of a decode and a display time relative to the data unit, and identification information that identifies an association between the data unit and the time information from a stream;

extracting, with the electronic processor, the data unit that is encoded from the data packet;

restoring, with the electronic processor, the time information from the time information packet;

associating, with the electronic processor, the data unit that is encoded with the time information based on the identification information; and generating, with the electronic processor, a second data unit by decoding the data unit that is encoded, wherein the time information packet is separate from the data packet.

* * * * *